(12) United States Patent
Grantham et al.

(10) Patent No.: US 10,698,583 B2
(45) Date of Patent: Jun. 30, 2020

(54) COLLABORATIVE ACHIEVEMENT INTERFACE

(71) Applicant: Snap Inc., Santa Monica, CA (US)

(72) Inventors: Matthew Colin Grantham, Toronto (CA); Jeremy Voss, Los Angeles, CA (US); David Whyte, Toronto (CA); Haibo Zhao, Redondo Beach, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/146,733

(22) Filed: Sep. 28, 2018

(65) Prior Publication Data

US 2020/0104020 A1    Apr. 2, 2020

(51) Int. Cl.
| | | |
|---|---|---|
| *H04L 29/08* | (2006.01) |
| *G06F 3/0484* | (2013.01) |
| *G06F 3/0481* | (2013.01) |
| *G06T 11/60* | (2006.01) |
| *G06F 3/0482* | (2013.01) |
| *G06F 9/451* | (2018.01) |

(52) U.S. Cl.
CPC .......... *G06F 3/0484* (2013.01); *G06F 3/0482* (2013.01); *G06F 3/04817* (2013.01); *G06T 11/60* (2013.01); *H04L 67/306* (2013.01); *G06F 9/451* (2018.02); *G06T 2200/24* (2013.01)

(58) Field of Classification Search
CPC combination set(s) only.
See application file for complete search history.

(56) References Cited

U.S. PATENT DOCUMENTS

| | | | |
|---|---|---|---|
| 9,804,752 B1 * | 10/2017 | Mall | H04L 67/22 |
| 10,242,477 B1 * | 3/2019 | Charlton | A63F 13/00 |
| 2011/0046981 A1 * | 2/2011 | Metzler | G06Q 30/02 705/3 |
| 2011/0238755 A1 | 9/2011 | Khan et al. | |
| 2012/0253918 A1 * | 10/2012 | Marois | G06Q 30/02 705/14.39 |

(Continued)

FOREIGN PATENT DOCUMENTS

KR    101664345 B1    10/2016

OTHER PUBLICATIONS

"International Application Serial No. PCT/US2019/053575, International Search Report dated Jan. 17, 2020", 3 pgs.

(Continued)

*Primary Examiner* — Hien L Duong
(74) *Attorney, Agent, or Firm* — Schwegman Lundberg & Woessner, P.A.

(57) ABSTRACT

Embodiments of the present disclosure relate generally to a collaborative achievement system for: detecting, at a client device associated with a first user, a collaborative achievement between at least the first user and a second user; selecting an achievement designator based on attributes of the collaborative achievement, wherein the achievement designator comprises personalization instructions for the achievement designator; retrieving, at the client device, user profile information from a first user account and a second user account associated with the first user and the second user; personalizing the achievement designator based on the user profile information and the personalization instructions; and causing display of a presentation of the personalized achievement designator at the client device.

18 Claims, 12 Drawing Sheets

(56) References Cited

U.S. PATENT DOCUMENTS

| | | |
|---|---|---|
| 2012/0266081 A1 | 10/2012 | Kao |
| 2014/0024450 A1* | 1/2014 | Ramachandran ....... A63F 13/10 |
| | | 463/31 |
| 2014/0059040 A1 | 2/2014 | Cha et al. |
| 2015/0234939 A1* | 8/2015 | Aharony ............. G06F 16/9535 |
| | | 707/737 |
| 2015/0294222 A1* | 10/2015 | Toon ................... G06F 16/9535 |
| | | 706/11 |
| 2017/0083628 A1 | 3/2017 | Frenkel et al. |
| 2017/0161388 A1* | 6/2017 | Aziz .................... G06Q 10/109 |
| 2017/0169800 A1* | 6/2017 | Greco .................. G06F 3/0482 |

OTHER PUBLICATIONS

"International Application Serial No. PCT/US2019/053575, Written Opinion dated Jan. 17, 2020", 5 pgs.

\* cited by examiner

400

```
┌─────────────────────────────────────────────────────────────┐
│  DETECTING, AT A CLIENT DEVICE ASSOCIATED WITH A FIRST USER │
│  ACCOUNT, A COLLABORATIVE ACHIEVEMENT BETWEEN THE FIRST USER│
│         ACCOUNT AND A SECOND USER ACCOUNT                   │
│                          402                                │
└─────────────────────────────────────────────────────────────┘
                              │
                              ▼
┌─────────────────────────────────────────────────────────────┐
│    SELECTING AN ACHIEVEMENT DESIGNATOR BASED ON THE         │
│  COLLABORATIVE ACHIEVEMENT, THE ACHIEVEMENT DESIGNATOR      │
│ COMPRISING A GRAPHIC TEMPLATE THAT DEFINES PERSONALIZATION  │
│        INSTRUCTIONS FOR THE ACHIEVEMENT DESIGNATOR          │
│                          404                                │
└─────────────────────────────────────────────────────────────┘
                              │
                              ▼
┌─────────────────────────────────────────────────────────────┐
│  RETRIEIVING, AT THE CLIENT DEVICE, USER PROFILE INFORMATION OF │
│     THE FIRST USER ACCOUNT AND THE SECOND USER ACCOUNT      │
│                          406                                │
└─────────────────────────────────────────────────────────────┘
                              │
                              ▼
┌─────────────────────────────────────────────────────────────┐
│   CAUSING DISPLAY OF A PRESENTATION OF THE PERSONALIZED     │
│      ACHIEVEMENT DESIGNATOR AT THE CLIENT DEVICE            │
│                          408                                │
└─────────────────────────────────────────────────────────────┘
```

RECEIVING AN IDENTIFICATION OF THE SECOND USER ACCOUNT FROM THE FIRST USER ACCOUNT, AT THE CLIENT DEVICE
502

CAUSING DISPLAY OF A USER PROFILE OF THE SECOND USER ACCOUNT AT THE CLIENT DEVICE IN RESPONSE TO THE IDENTIFICATION OF THE SECOND USER ACCOUNT, THE USER PROFILE OF THE SECOND USER ACCOUNT INCLUDING A DISPLAY OF THE PRESENTATION OF THE ACHIEVEMENT DESIGNATOR THAT INCLUDES THE USER PROFILE INFORMATION OF THE FIRSR USER ACCOUNT AND THE SECOND USER ACCOUNT
504

*FIG. 5*

COLLABORATIVE ACHIEVEMENT INTERFACE

TECHNICAL FIELD

Embodiments of the present disclosure relate generally to graphical user interfaces (GUI), and more particularly, to systems for generating and causing display of GUIs.

BACKGROUND

A social networking service is an online platform which people use to build social networks with other users. Social networking services vary in format and the number of features and can incorporate a range of new information and communication tools, operating on desktops and on laptops, on mobile devices such as tablet computers and smartphones. Users of social networking services may interact with one another through personalized user profiles.

A user profile is a visual display of personal data associated with a specific user, or a customized desktop environment. A profile refers therefore to the explicit digital representation of a person or entity's identity. A profile can be used to store the description of the characteristics of a person. This information can be exploited by systems taking into account the persons' characteristics and preferences.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method for presenting a notification related to a collaborative achievement, according to certain example embodiments.

FIG. 5 is a flowchart illustrating a method for presenting a notification related to a collaborative achievement, according to certain example embodiments.

DETAILED DESCRIPTION

Figure 1:
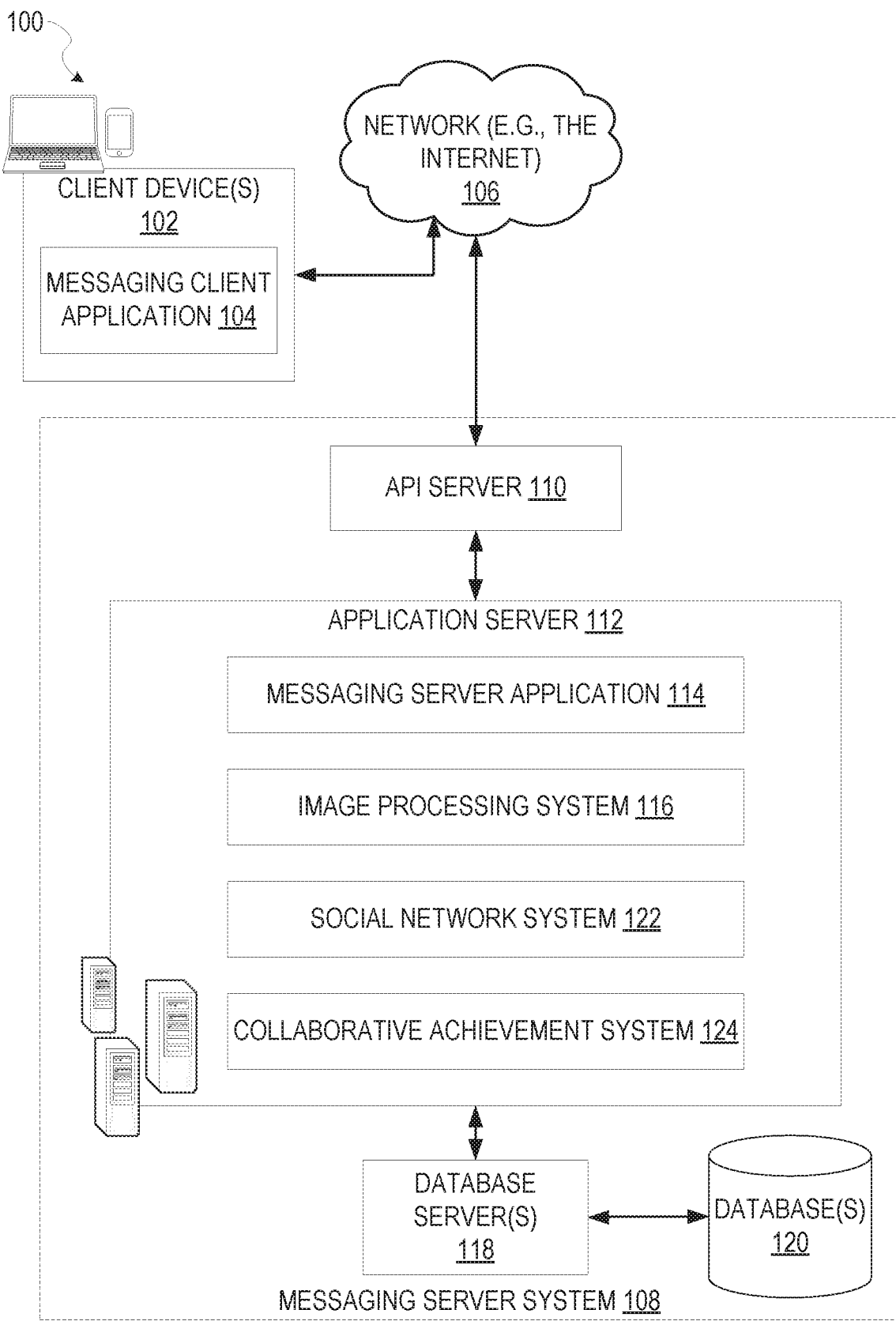
FIG. 1 is a block diagram showing an example messaging system for exchanging data (e.g., messages and associated content) over a network in accordance with some embodiments, wherein the messaging system includes a collaborative achievement system.

Systems to generate a graphical user interface (GUI) to display user profiles are described. Embodiments of the present disclosure relate generally to a collaborative achievement system for: detecting, at a client device associated with a first user, a collaborative achievement between at least the first user and a second user; selecting an achievement designator based on attributes of the collaborative achievement, wherein the achievement designator includes display and personalization instructions of the achievement designator; retrieving, at the client device, a portion of user profile information from a first user account and a second user account associated with the first user and the second user, the portion of the user profile information based on the personalization instructions; generating a presentation of the achievement designator based on the user profile information and the personalization instructions; and causing display of the presentation of the achievement designator at the client device.

The achievement designators represent certain milestones or "collaborative achievements" between users participating in a social networking system. Collaborative achievements may be based on user profile information or user attributes of users, as well as based on user actions performed by the users. For example, a collaborative achievement may include a determination that two users communicating with one another are located on separate continents, and may also include a determination that two users have communicated with one another on a daily basis for a threshold number of days. Collaborative achievements may therefore be detected based on users actions, and responsive to receiving requests for those user actions, as well as based on user attributes of the users.

The collaborative achievement system may maintain a database of collaborative achievement triggers, wherein the triggers include certain user attributes or user actions performed by users. For example, each trigger among the database of collaborative achievement triggers may correspond to a distinct collaborative achievement between users, and may be associated with a corresponding "achievement designator" that comprises a graphical element and personalization instructions for the graphical element. For example, the achievement designators may be personalized based on user attributes and user profile information of the corresponding users defined by the personalization instructions. An achievement designator may therefore include a graphics template that defines the personalization instructions for a particular graphical element. For example, the graphics template may identify relevant user profile information or attributes to retrieve from corresponding user profiles, as well as display instructions for how to present the graphical element based on the user profile information or attributes.

In some embodiments, in response to detecting a collaborative achievement between a first user and a second user, the collaborative achievement system presents notifications at corresponding devices to alert the users of the achievement. The notifications may for example include a display of the achievement designator that includes a display of the user profile information of the users.

In some embodiments, the collaborative achievement system maintains a database of collaborative achievements between users, and presents a set of collaborative achievement designators retrieved from the database within a portion of a user profile associated with the users. For example, the user profile may be configured to display shared collateral achievements between two or more users, such that a first user viewing a user profile of a second user may be presented with a set of shared collaborative achievement designators representing collaborative achievements between the first user and the second user. The achievement designators may be presented in a horizontal array within a portion of the user profile, wherein a sequence or sort order of the achievement designators is based on an attribute or property of the achievement designators, such as temporal information that indicates a time or date in which the corresponding collaborative achievement was detected.

Consider an illustrative example from a user perspective. A first user and a second user with corresponding user profiles (a first user profile and a second user profile) may interact with one another through a social networking system by exchanges messages or media content. For example, over a period of one month, the users may participate in a communication session by sending messages back and forth through an interface presented by the collaborative achievement system 124. The collaborative achievement system 124 may track attributes of the communication session between the users, such as a duration, as well as a number of messages sent.

The collaborative achievement system 124 maintains and references a database that contains trigger events. Upon detecting a trigger event based on the attributes of the communication session, such as a number of messages transgressing a threshold value (e.g., 1,000 messages), the collaborative achievement system 124 generates and causes display of a personalized achievement designator that includes a presentation of user profile information of the first and second user within user profiles of both the first and second user. For example, the user profile information presented within the achievement designator may include graphical avatars associated with the users, such as Bitmoji.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a collaborative achievement system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories, galleries, or collections). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
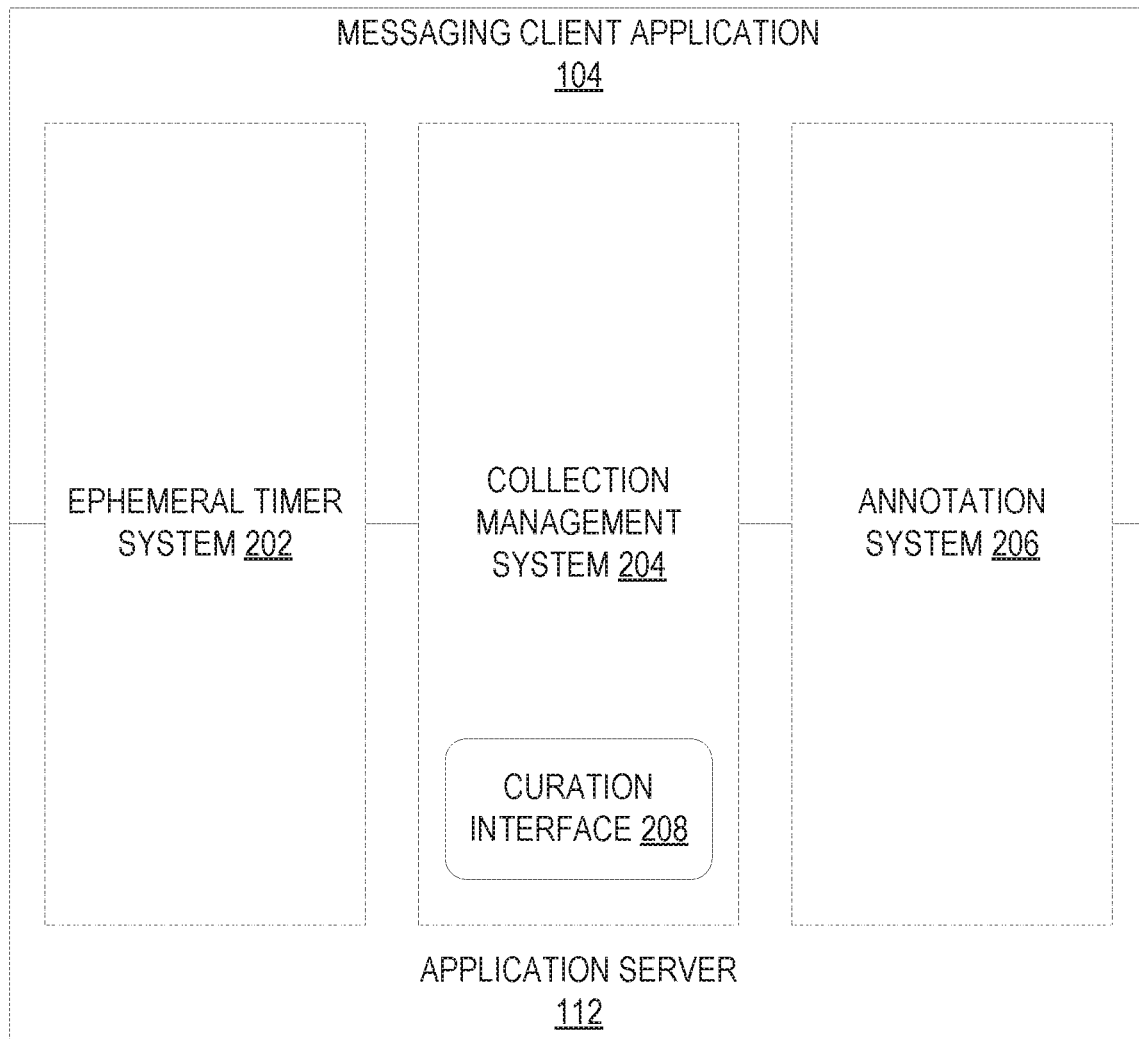
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages, or graphical element, selectively display and enable access to messages and associated content via the messaging client application 104. Further details regarding the operation of the ephemeral timer system 202 are provided below.

The collection management system 204 is responsible for managing collections of media (e.g., a media collection that includes collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects, as well as augmented reality overlays. Examples of audio and visual content include pictures, texts, logos, animations, and sound effects, as well as animated facial models, image filters, and augmented reality media content. An example of a visual effect includes color overlaying. The audio and visual content or the visual effects can be applied to a media content item (e.g., a photo or video or live stream) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
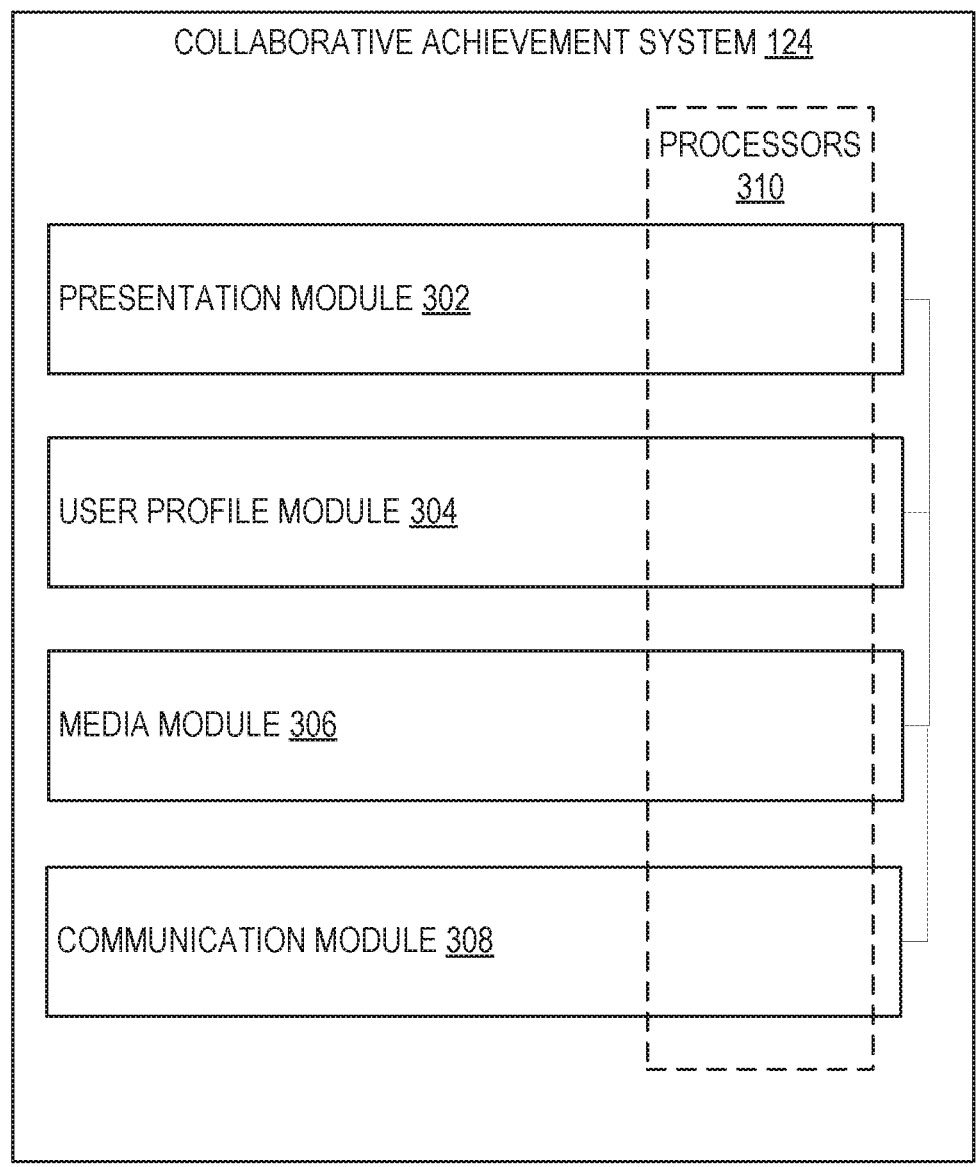
FIG. 3 is a block diagram illustrating various modules of a collaborative achievement system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the collaborative achievement system 124 that configure the collaborative achievement system 124 to perform operations that include: detecting, at a client device associated with a first user, a collaborative achievement between at least the first user and a second user; selecting an achievement designator based on attributes of the collaborative achievement, wherein the achievement designator comprises personalization instructions for the achievement designator; retrieving, at the client device, user profile information from a first user account and a second user account associated with the first user and the second user; personalizing the achievement designator based on the user profile information and the personalization instructions; and causing display of a presentation of the personalized achievement designator at the client device, according to some example embodiments. The collaborative achievement system 124 is shown as including a presentation module 302, a user profile module 304, a media module 306, and a communication module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the collaborative achievement system 124 may physically include an arrangement of one or more of the processors 310 (e.g., a subset of or among the one or more processors of the machine) configured to perform the operations described herein for that module. As another example, any module of the collaborative achievement system 124 may include software, hardware, or both, that configure an arrangement of one or more processors 310 (e.g., among the one or more processors of the machine) to perform the operations described herein for that module. Accordingly, different modules of the collaborative achievement system 124 may include and configure different arrangements of such processors 310 or a single arrangement of such processors 310 at different points in time. Moreover, any two or more modules of the collaborative achievement system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart illustrating a method 400 for presenting a notification associated with a collaborative achievement, according to certain example embodiments. Operations of the method 400 may be performed by the modules described above with respect to FIG. 3. As shown in FIG. 4, the method 400 includes one or more operations 402, 404, 406, and 408.

At operation 402, the user profile module 304 detects a collaborative achievement between a first user and a second user. As discussed above, a collaborative achievement may be based on user profile information or user attributes of users, as well as based on user actions performed by the users. For example, a collaborative achievement may include a determination that two users communicating with one another are located on separate continents, and may also include a determination that two users have communicated with one another on a daily basis for a threshold number of days. Collaborative achievements may therefore be detected responsive to receiving requests for user actions (e.g., a message request), as well as based on user attributes of the users alone.

For example, in response to receiving a user action in a communication session between a first user and a second user, the user profile module 304 may access a database 120, wherein the database 120 contains a repository of triggers that are defined as one or more user attributes or user actions. For example, each trigger may comprise an identification of one or more user attributes or actions that correspond to a distinct collaborative achievement between users, which may be associated with a corresponding "achievement designator."

At operation 404, the user profile module 304 selects an achievement designator based on the collaborative achievement, wherein the achievement designator comprises a graphic template that defines personalization instructions for the achievement designator. For example, the user profile module 304 selects the achievement designator from a database 120.

At operation 406, the user profile module 304 retrieves user profile information of a first user account associated with the first user, and a second user account associated with the second user, in response to the detecting the collaborative achievement. For example, the user profile information may include demographics information, location information, as well as user identifiers, such as graphical avatars (e.g., Bitmoji) that represent the first and second users.

The user profile module 304 may retrieve the user profile information from respective client devices of the first user and second user. In some embodiments, the graphic template of the achievement designator may define the specific user profile information that the user profile module 304 retrieves. For example, the graphic template may indicate that the achievement designator requires a user identifier, such as a graphical avatar, in order to personalize the achievement designator.

At operation 408, the media module 306 generates a presentation of the achievement designator based on the user profile information, and the presentation module 302 causes display of a presentation of the achievement designator at the client device. For example, the presentation of the achievement designator that includes the user profile information may be displayed in a notification at the client device.

FIG. 5 is a flowchart illustrating a method 500 for presenting a notification associated with a collaborative achievement, according to certain example embodiments. Operations of the method 500 may be performed by the modules described above with respect to FIG. 3. As shown in FIG. 5, the method 500 includes one or more operations 502, and 504.

At operation 502, the communication module 308 receives an input from a first user via a client device 102 that comprises an identification of a second user account. For example, the input may be a search request, or a request to view a user profile of the second user.

At operation 504, the presentation module 302 causes display of a user profile of the second user in response to the input. In some embodiments, the user profile of the second user may include a display of a set of achievement designators that acknowledge collaborative achievements between the first user and the second user.

Figure 8:
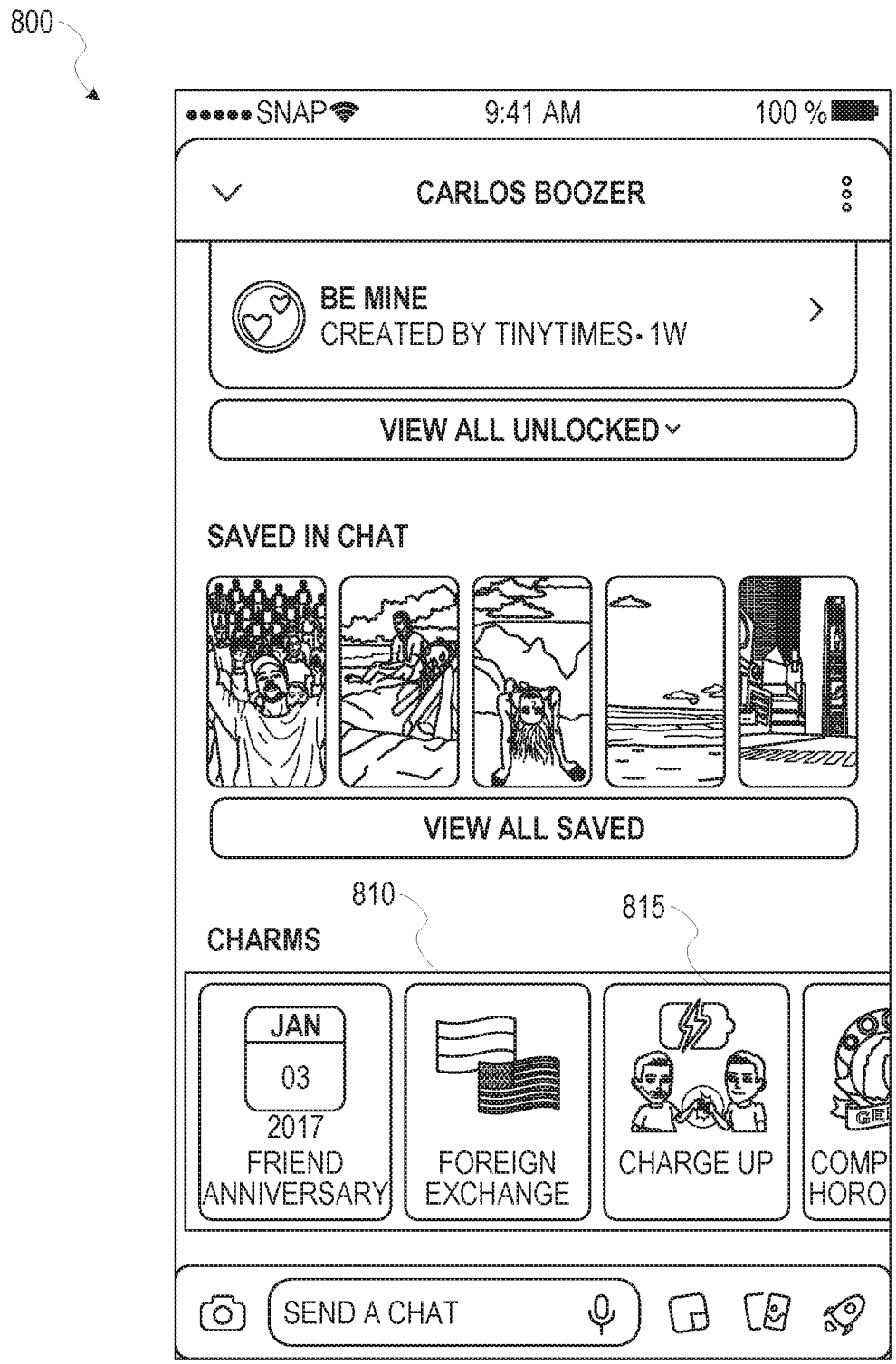
FIG. 8 is an interface diagram depicting a GUI to present indications of collaborative achievements, according to certain example embodiments.

According to such embodiments, the set of achievement designators may be presented horizontally along a portion of the user profile, such that a user viewing the set of achievement designators may provide an input to scroll through the set of achievement designators, as seen in the GUI 800 depicted in FIG. 8.

Figure 6:
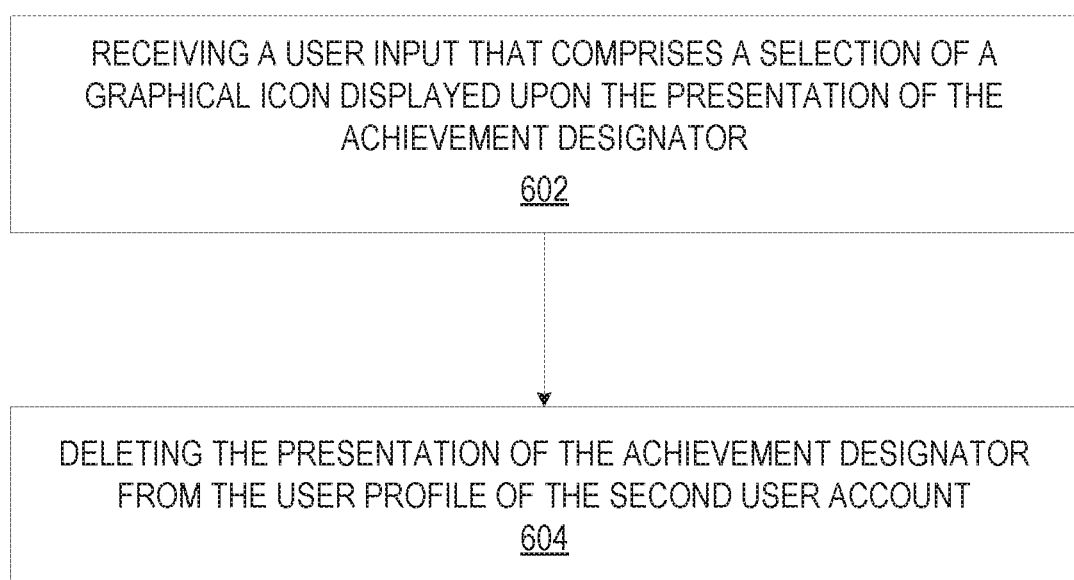
FIG. 6 is a flowchart illustrating a method for presenting a notification related to a collaborative achievement, according to certain example embodiments.

FIG. 6 is a flowchart illustrating a method 600 for presenting a notification associated with a collaborative achievement, according to certain example embodiments. Operations of the method 600 may be performed by the modules described above with respect to FIG. 3. As shown in FIG. 6, the method 600 includes one or more operations 602, and 604.

Figure 10:
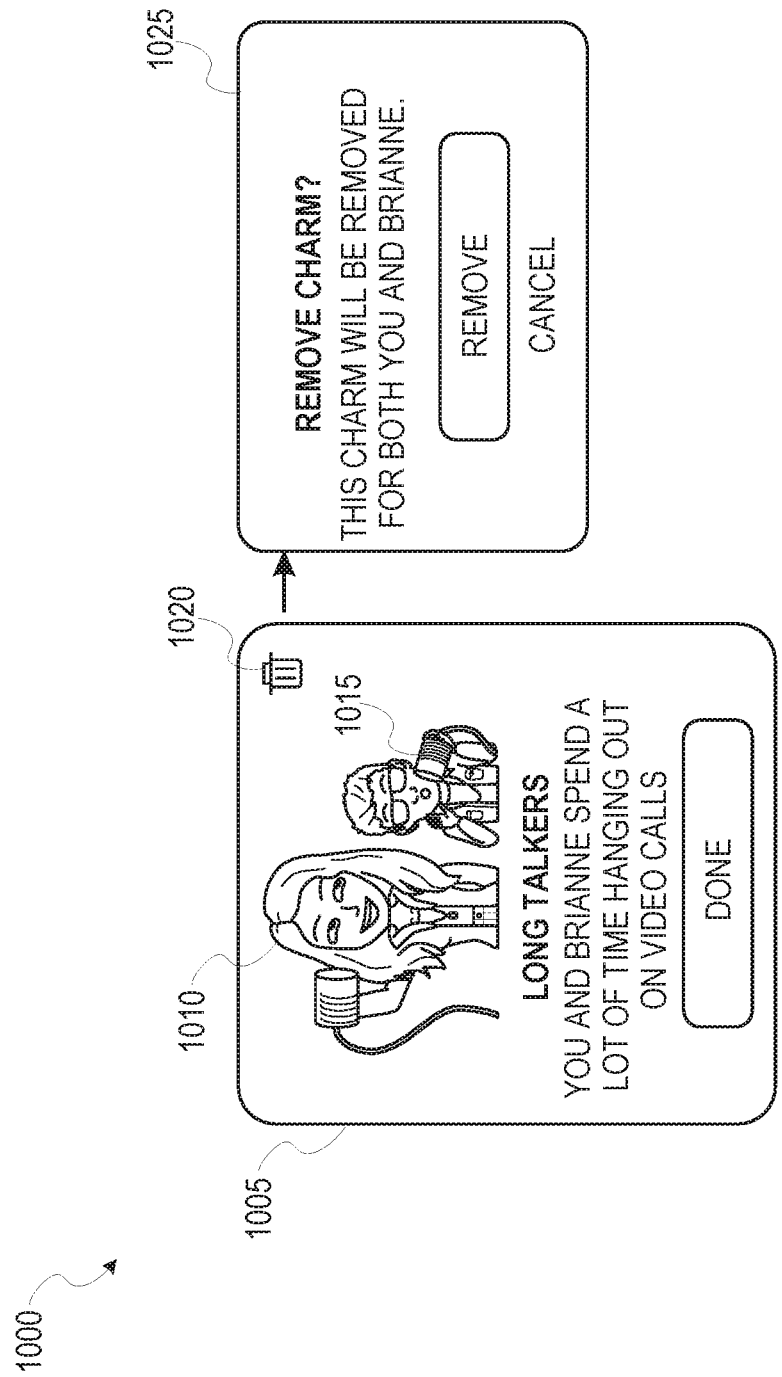
FIG. 10 is a diagram depicting an achievement designator, according to certain example embodiments.

At operation 602, the communication module 308 receives an input that comprises a selection of a graphical icon display upon the presentation of the achievement designator. For example, as seen in FIG. 10, the graphical icon may include graphical icon 1010.

At operation 604, the presentation module 302 removes the presentation of the achievement designator from the user profiles of the first user and the second user. In some embodiments, the communication module 308 may present a notification to the first user and second user notifying the users that the achievement designator has been removed.

Figure 7:
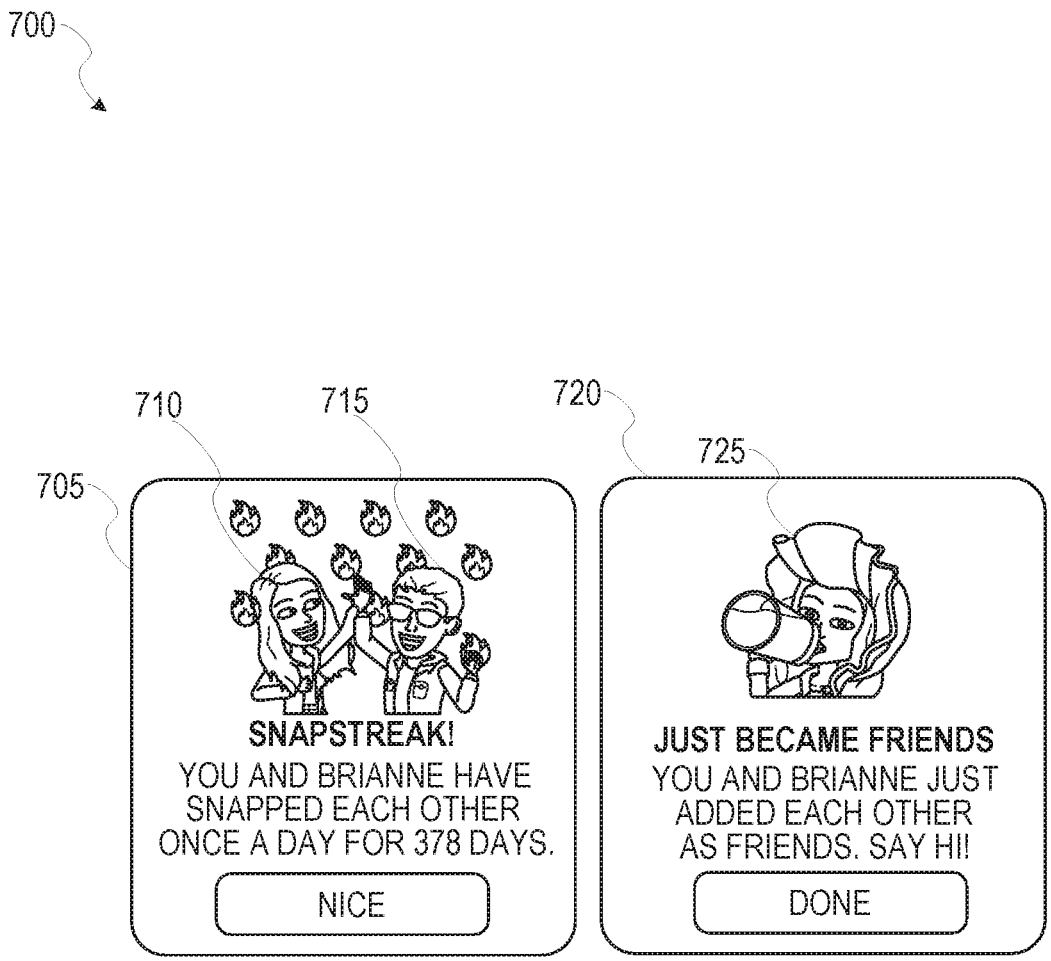
FIG. 7 is a diagram depicting a set of achievement designators generated by a collaborative achievement system, according to certain example embodiments.

FIG. 7 is a diagram depicting a set of achievement designators 700 generated by a collaborative achievement system 124, according to certain example embodiments. As discussed in the method 400 depicted in FIG. 4, each achievement designator among the set of achievement designators 700 may be generated based on user profile information and user attributes of users associated with a collaborative achievement.

For example, achievement designator 705 comprises a display of user identifiers 710 and 715 (i.e., Bitmoji associated with a first user and a second user). Similarly, achievement designator 720 comprises a display of a user identifier 725.

FIG. 8 is an interface diagram depicting a GUI 800 to present indications of collaborative achievements, according to certain example embodiments.

As seen in FIG. 8, the GUI 800 includes a user profile of a user. As discussed in the method 500 of FIG. 5, the user profile displayed in the GUI 800 may include a presentation of a set of achievement designators 810, displayed horizontally along a portion of the GUI 800.

Each achievement designator, such as the achievement designator 815, comprises a display of user profile information of a user associated with the user profile displayed within the GUI 800, and a user viewing the user profile within the GUI 800.

Figure 9:
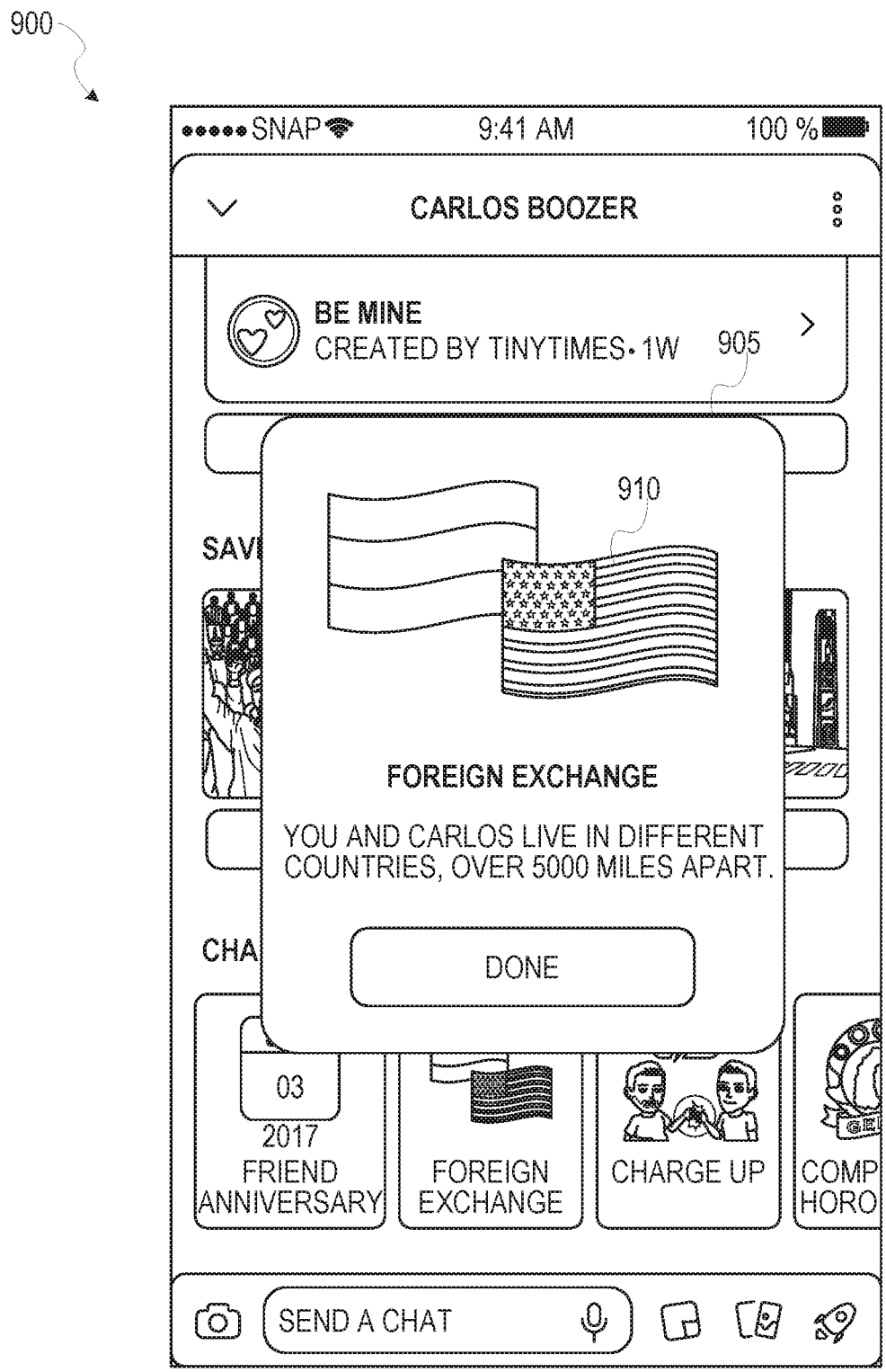
FIG. 9 is an interface diagram depicting a GUI to present indications of collaborative achievements, according to certain example embodiments.

FIG. 9 is an interface diagram depicting a GUI 900 to present indications of collaborative achievements, according to certain example embodiments.

As seen in FIG. 9, the GUI 900 may include a display of a notification 905 that comprises a presentation of user profile information 910, as discussed in the method 400 depicted in FIG. 4.

For example, a first user viewing the GUI 900 may be presented with the notification 905 in response to the collaborative achievement system 124 detecting a collaborative achievement between the first user and a second user. The collaborative achievement may for example include a determination based on user profile information of the first user and second user, that the users are located on different countries. In response to detecting the collaborative achievement, the collaborative achievement system retrieves user profile information (e.g., the user profile information 910), and generates an achievement designator based on the user profile information 910 (i.e., the locations of the first user and second user).

FIG. 10 is a diagram 1000 depicting an achievement designator 1005, according to certain example embodiments. As seen in the diagram 1000, the achievement designator 1005 comprises a display of user identifiers 1010 and 1015, as well as a graphical icon 1020.

As discussed in the method 600 of FIG. 6, in response to receiving a selection of the graphical icon 1020, the collaborative achievement system 124 may remove the presentation of the achievement designator from the user profiles of the associated users (i.e., the user depicted by the user identifiers 1010 and 1015).

In some embodiments, in response to receiving a selection of the graphical icon 1020, the collaborative achievement system 124 may cause display of the notification 1025 at respective client devices of the users depicted by the user identifiers 1010 and 1015.

Software Architecture

Figure 11:
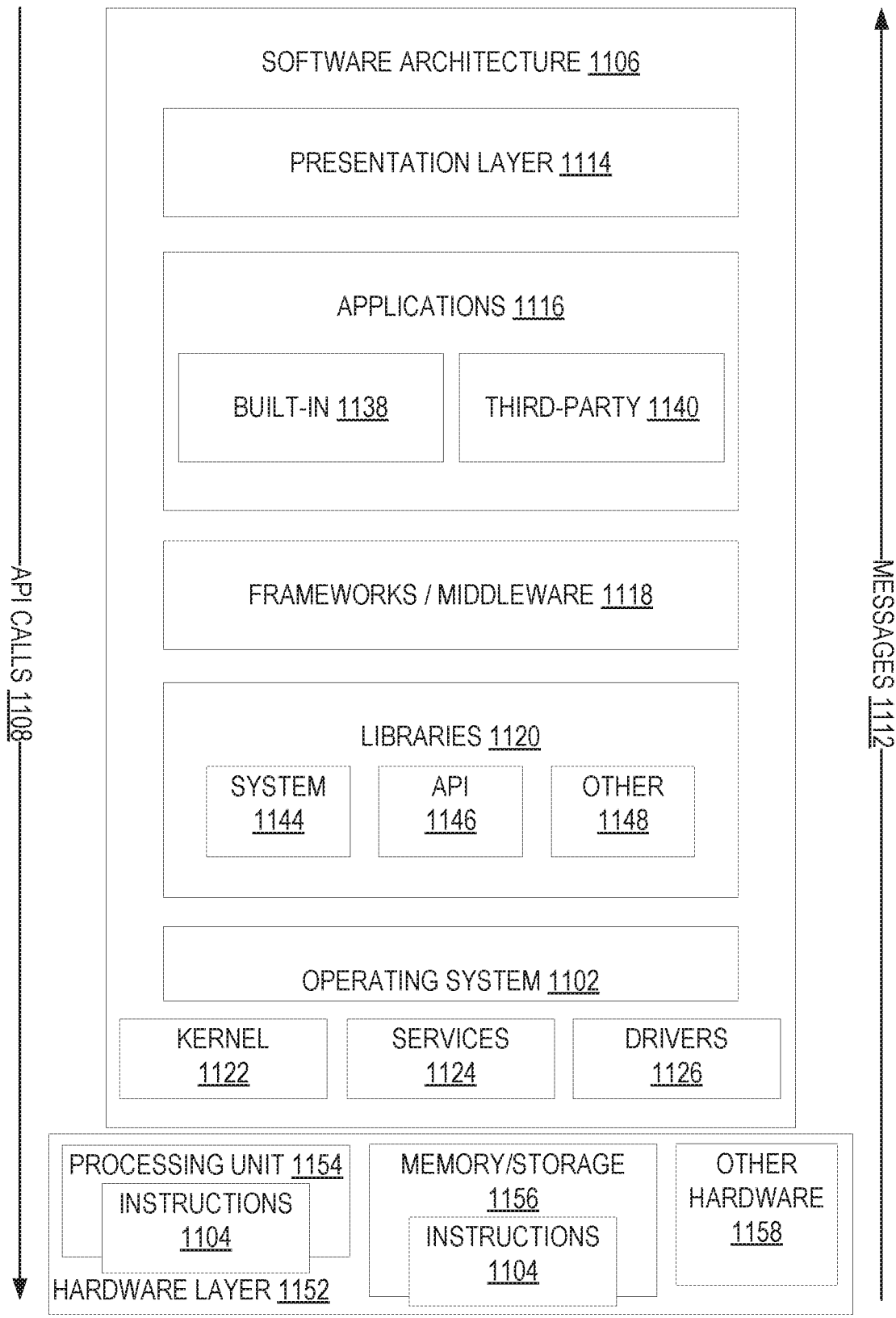
FIG. 11 is a block diagram illustrating a representative software architecture, which may be used in conjunction with various hardware architectures herein described and used to implement various embodiments.

FIG. 11 is a block diagram illustrating an example software architecture 1106, which may be used in conjunction with various hardware architectures herein described. FIG. 11 is a non-limiting example of a software architecture and it will be appreciated that many other architectures may be implemented to facilitate the functionality described herein. The software architecture 1106 may execute on hardware such as the machine 1200 of FIG. 12 that includes, among other things, processors 1204, memory 1214, and I/O components 1218. A representative hardware layer 1152 is illustrated and can represent, for example, the machine 1100 of FIG. 11. The representative hardware layer 1152 includes a processing unit 1154 having associated executable instructions 1104. Executable instructions 1104 represent the executable instructions of the software architecture 1106, including implementation of the methods, components and so forth described herein. The hardware layer 1152 also includes memory and/or storage modules memory/storage 1156, which also have executable instructions 1104. The hardware layer 1152 may also comprise other hardware 1158.

In the example architecture of FIG. 11, the software architecture 1106 may be conceptualized as a stack of layers where each layer provides particular functionality. For example, the software architecture 1106 may include layers such as an operating system 1102, libraries 1120, applications 1116 and a presentation layer 1114. Operationally, the applications 1116 and/or other components within the layers may invoke application programming interface (API) API calls 1108 through the software stack and receive a response as in response to the API calls 1108. The layers illustrated are representative in nature and not all software architectures have all layers. For example, some mobile or special purpose operating systems may not provide a frameworks/middleware 1118, while others may provide such a layer. Other software architectures may include additional or different layers.

The operating system 1102 may manage hardware resources and provide common services. The operating system 1102 may include, for example, a kernel 1122, services 1124 and drivers 1126. The kernel 1122 may act as an abstraction layer between the hardware and the other software layers. For example, the kernel 1122 may be responsible for memory management, processor management (e.g., scheduling), component management, networking, security settings, and so on. The services 1124 may provide other common services for the other software layers. The drivers 1126 are responsible for controlling or interfacing with the underlying hardware. For instance, the drivers 1126 include display drivers, camera drivers. Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1120 provide a common infrastructure that is used by the applications 1116 and/or other components and/or layers. The libraries 1120 provide functionality that allows other software components to perform tasks in an easier fashion than to interface directly with the underlying operating system 1102 functionality (e.g., kernel 1122, services 1124 and/or drivers 1126). The libraries 1120 may include system libraries 1144 (e.g., C standard library) that may provide functions such as memory allocation functions, string manipulation functions, mathematical functions, and the like. In addition, the libraries 1120 may include API libraries 1146 such as media libraries (e.g., libraries to support presentation and manipulation of various media format such as MPREG4, H.264. MP3, AAC, AMR. JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1120 may also include a wide variety of other libraries 1148 to provide many other APIs to the applications 1116 and other software components/modules.

The frameworks/middleware 1118 (also sometimes referred to as middleware) provide a higher-level common infrastructure that may be used by the applications 1116 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1116 and/or other software components/modules, some of which may be specific to a particular operating system 1102 or platform.

The applications 1116 include built-in applications 1138 and/or third-party applications 1140. Examples of representative built-in applications 1138 may include, but are not limited to, a contacts application, a browser application, a book reader application, a location application, a media application, a messaging application, and/or a game application. Third-party applications 1140 may include an application developed using the ANDROID™ or IOS™ software development kit (SDK) by an entity other than the vendor of the particular platform, and may be mobile software running on a mobile operating system such as IOS™. ANDROID™. WINDOWS® Phone, or other mobile operating systems. The third-party applications 1140 may invoke the API calls 1108 provided by the mobile operating system (such as operating system 1102) to facilitate functionality described herein.

The applications 1116 may use built in operating system functions (e.g., kernel 1122, services 1124 and/or drivers 1126), libraries 1120, and frameworks/middleware 1118 to create user interfaces to interact with users of the system. Alternatively. or additionally, in some systems interactions with a user may occur through a presentation layer, such as presentation layer 1114. In these systems, the application/component "logic" can be separated from the aspects of the application/component that interact with a user.

Figure 12:
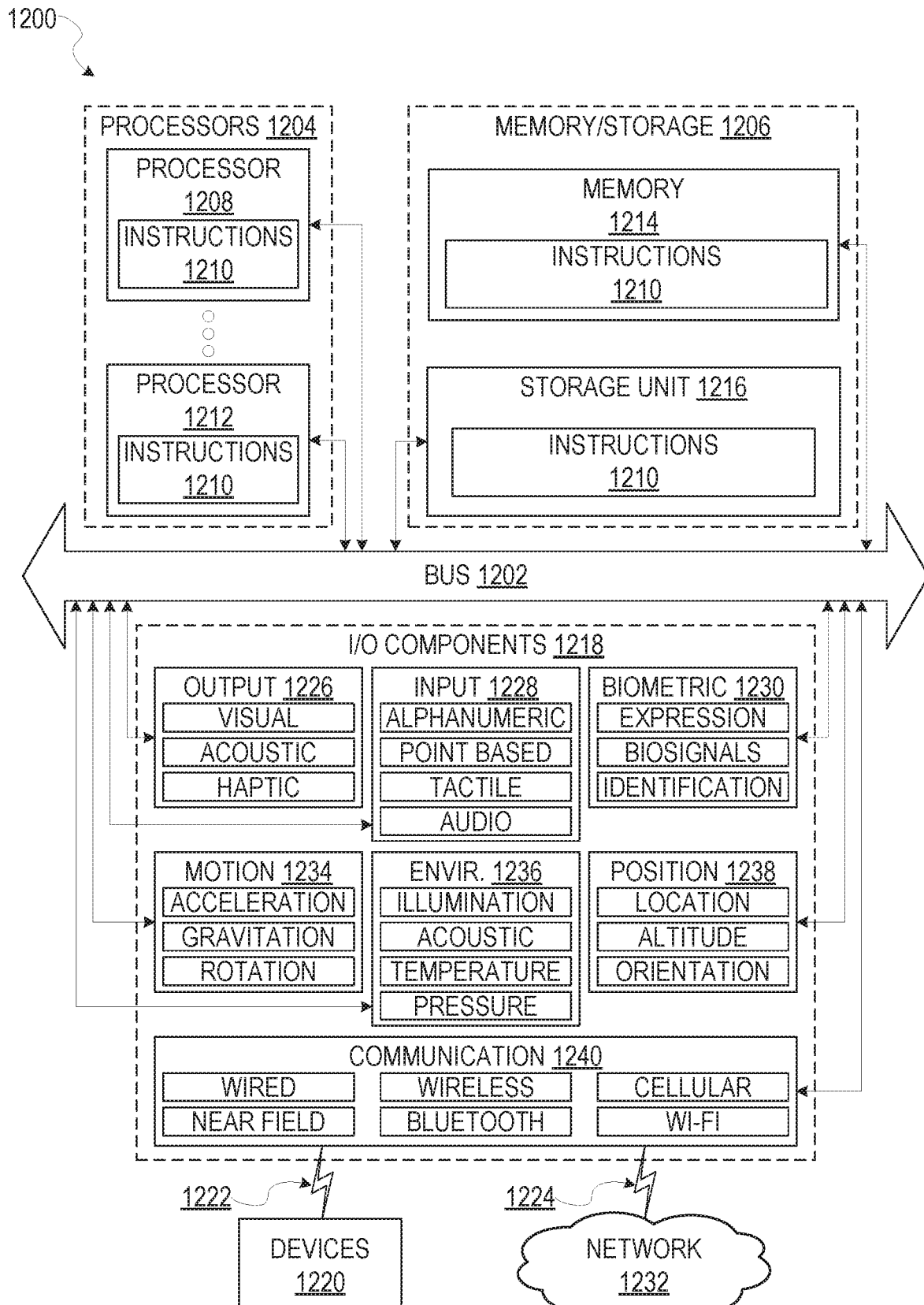
FIG. 12 is a block diagram illustrating components of a machine, according to some example embodiments, able to read instructions from a machine-readable medium (e.g., a machine-readable storage medium) and perform any one or more of the methodologies discussed herein.

FIG. 12 is a block diagram illustrating components of a machine 1200, according to some example embodiments, able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system, within which instructions 1210 (e.g., software, a program, an application, an applet, an app, or other executable code) for causing the machine 1200 to perform any one or more of the methodologies discussed herein may be executed. As such, the instructions 1210 may be used to implement modules or components described herein. The instructions 1210 transform the general non-programmed machine 1200 into a particular machine 1200 programmed to carry out the described and illustrated functions in the manner described. In alternative embodiments, the machine 1200 operates as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1210, sequentially or otherwise, that specify actions to be taken by machine 1200. Further, while only a single machine 1200 is illustrated, the term "machine" shall also be taken to include a collection of machines that individually or jointly execute the instructions 1210 to perform any one or more of the methodologies discussed herein.

The machine 1200 may include processors 1204, memory memory/storage 1206, and I/O components 1218, which may be configured to communicate with each other such as via a bus 1202. The memory/storage 1206 may include a memory 1214, such as a main memory, or other memory storage, and a storage unit 1216, both accessible to the processors 1204 such as via the bus 1202. The storage unit 1216 and memory 1214 store the instructions 1210 embodying any one or more of the methodologies or functions described herein. The instructions 1210 may also reside, completely or partially, within the memory 1214, within the storage unit 1216, within at least one of the processors 1204 (e.g., within the processor's cache memory), or any suitable combination thereof, during execution thereof by the machine 1200. Accordingly, the memory 1214, the storage unit 1216, and the memory of processors 1204 are examples of machine-readable media.

The I/O components 1218 may include a wide variety of components to receive input, provide output, produce output, transmit information, exchange information, capture measurements, and so on. The specific I/O components 1218 that are included in a particular machine 1200 will depend on the type of machine. For example, portable machines such as mobile phones will likely include a touch input device or other such input mechanisms, while a headless server machine will likely not include such a touch input device. It will be appreciated that the I/O components 1218 may include many other components that are not shown in FIG. 12. The I/O components 1218 are grouped according to functionality merely for simplifying the following discussion and the grouping is in no way limiting. In various example embodiments, the I/O components 1218 may include output components 1226 and input components 1228. The output components 1226 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1228 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1218 may include biometric components 1230, motion components 1234, environmental environment components 1236, or position components 1238 among a wide array of other components. For example, the biometric components 1230 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1234 may include acceleration sensor components (e.g., accelerometer), gravitation sensor components, rotation sensor components (e.g., gyroscope), and so forth. The environment components 1236 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1238 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1218 may include communication components 1240 operable to couple the machine 1200 to a network 1232 or devices 1220 via coupling 1222 and coupling 1224 respectively. For example, the communication components 1240 may include a network interface component or other suitable device to interface with the network 1232. In further examples, communication components 1240 may include wired communication components, wireless communication components, cellular communication components, Near Field Communication (NFC) components. Bluetooth® components (e.g., Bluetooth® Low Energy). Wi-Fi® components, and other communication components to provide communication via other modalities. The devices 1220 may be another machine or any of a wide variety of peripheral devices (e.g., a peripheral device coupled via a Universal Serial Bus (USB)).

Moreover, the communication components 1240 may detect identifiers or include components operable to detect identifiers. For example, the communication components 1240 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code. Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1240, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (IxRTT), Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands". "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    receiving, at a client device associated with a first user account, a message within a communication session between the first user account and a second user account, the communication session comprising a plurality of messages;
    determining a total number of messages from among the plurality of messages transgresses a threshold value in response to the receiving the message within the communication session,
    detecting a collaborative achievement between at least the first user account and the second user account in response to the determining that the total number of messages from among the plurality of messages transgressed the threshold value;
    selecting an achievement designator based on the collaborative achievement, the achievement designator comprising a graphic template that defines personalization instructions for the achievement designator;
    retrieving, at the client device, user profile information from the first user account and the second user account, the user profile information including a first graphical avatar associated with the first user account and a second graphical avatar associated with the second user account;
    personalizing the achievement designator based on the graphic template, the first graphical avatar, and the second graphical avatar; and
    causing display of a presentation of the achievement designator at the client device, the presentation of the achievement designator including a display of the first graphical avatar and the second graphical avatar from the user profile information of the first user account and the second user account.

2. The method of claim 1, wherein the causing display of the presentation of the achievement designator at the client device includes:
    receiving an identification of the second user account from the first user account, at the client device; and
    causing display of a user profile of the second user account at the client device in response to the identification of the second user account, the user profile of the second user account including the presentation of the achievement designator that includes the user profile information of the first user account and the second user account.

3. The method of claim 2, wherein the presentation of the achievement designator comprises a graphical icon, and the method further comprises:
    receiving a user input that comprises a selection of the graphical icon; and
    deleting the presentation of the achievement designator from the user profile of the second user account.

4. The method of claim 2, wherein the user profile of the second user account comprises a display of a set of achievement designators associated with the first user account and the second user account within a portion of the user profile of the second user account, the display of the set of achievement designators comprising a horizontal array of the set of achievement designators, wherein a sequence of the set of achievement designators along the horizontal array is based on a property of each achievement designator among the set of achievement designators.

5. The method of claim 1, wherein the causing display of the presentation of the achievement designator at the client device includes:
    causing display of the presentation of the achievement designator among a plurality of achievement designators associated with the second user account, a position of the presentation of the achievement designator among the plurality of achievement designators based on an attribute of the collaborative achievement.

6. The method of claim 1, wherein the first graphical avatar and the second graphical avatar include bitmoji.

7. The method of claim 1, wherein the user profile information includes location data that identifies a first location associated with the first user account and a second location associated with the second user account, and the method further comprises:
    retrieving a first graphical element based on the first location associated with the first user account, and a second graphical element based on the second location associated with the second user account; and
    generating the presentation of the achievement designator based on the first graphical element and the second graphical element.

8. The method of claim 1, wherein the detecting, at the client device associated with the first user account, the collaborative achievement between the first user account and the second user account includes identifying a first user attribute of the first user account and a second user attribute of the second user account.

9. The method of claim 1, wherein the client device is a first client device, and the retrieving the user profile information of the second user account includes:
    requesting the user profile information from a second client device associated with the second user account; and
    receiving the user profile information at the first client device from the second client device.

10. A system comprising:
    a memory; and
    at least one hardware processor coupled to the memory and comprising instructions that causes the system to perform operations comprising:
        receiving, at a client device associated with a first user account, a message within a communication session between the first user account and a second user account, the communication session comprising a plurality of messages, determining a total number of messages from among the plurality of messages transgresses a threshold value in response to the receiving the message within the communication session;

detecting a collaborative achievement between at least the first user account and the second user account in response to the determining that the total number of messages from among the plurality of messages transgressed the threshold value;

selecting an achievement designator based on the collaborative achievement, the achievement designator comprising a graphic template that defines personalization instructions for the achievement designator;

retrieving, at the client device, user profile information from the first user account and the second user account, the user profile information including a first graphical avatar associated with the first user account and a second graphical avatar associated with the second user account;

personalizing the achievement designator based on the graphic template, the first graphical avatar, and the second graphical avatar; and causing display of a presentation of the achievement designator at the client device, the presentation of the achievement designator including a display of the first graphical avatar and the second graphical avatar from the user profile information of the first user account and the second user account.

11. The system of claim 10, wherein the causing display of the presentation of the achievement designator at the client device includes:

receiving an identification of the second user account from the first user account, at the client device; and causing display of a user profile of the second user account at the client device in response to the identification of the second user account, the user profile of the second user including a display of the presentation of the achievement designator that includes the user profile information of the first user account and the second user account.

12. The system of claim 11, wherein the presentation of the achievement designator includes a graphical icon, and the instructions cause the system to perform operations further comprising:

receiving a user input that comprises a selection of the graphical icon; and deleting the presentation of the achievement designator from the user profile of the second user.

13. The system of claim 11, wherein the user profile of the second user account comprises a display of a set of achievement designators associated with the first user account and the second user account within a portion of the user profile of the second user account, the display of the set of achievement designators comprising a horizontal array of the set of achievement designators, wherein a sequence of the set of achievement designators along the horizontal array is based on a property of each achievement designator among the set of achievement designators.

14. The system of claim 10, wherein the causing display of the presentation of the achievement designator at the client device includes:

causing display of the presentation of the achievement designator among a plurality of achievement designators associated with the second user account, a position of the presentation of the personalized achievement designator among the plurality of achievement designators based on an attribute of the collaborative achievement.

15. The system of claim 10, wherein the first graphical avatar and the second graphical avatar include bitmoji.

16. The system of claim 10, wherein the user profile information includes location data that identifies a first location associated with the first user account and a second location associated with the second user account, and the instructions cause the system to perform operations further comprising:

retrieving a first graphical element based on the first location associated with the first user account, and a second graphical element based on the second location associated with the second user account; and generating the presentation of the achievement designator based on the first graphical element and the second graphical element.

17. The system of claim 10, wherein the detecting, at the client device associated with the first user account, the collaborative achievement between the first user account and the second user account includes identifying a first user attribute of the first user account and a second user attribute of the second user account.

18. A non-transitory machine-readable storage medium comprising instructions that, when executed by one or more processors of a machine, cause the machine to perform operations comprising:

receiving, at a client device associated with a first user account, a message within a communication session between the first user account and a second user account, the communication session comprising a plurality of messages;

determining a total number of messages from among the plurality of messages transgresses a threshold value in response to the receiving the message within the communication session;

detecting a collaborative achievement between at least the first user account and the second user account in response to the determining that the total number of messages from among the plurality of messages transgressed the threshold value;

selecting an achievement designator based on the collaborative achievement, the achievement designator comprising a graphic template that defines personalization instructions for the achievement designator;

retrieving, at the client device, user profile information from the first user account and the second user account, the user profile information including a first graphical avatar associated with the first user account and a second graphical avatar associated with the second user account;

personalizing the achievement designator based on the graphic template, the first graphical avatar, and the second graphical avatar; and causing display of a presentation of the achievement designator at the client device, the presentation of the achievement designator including a display of the first graphical avatar and the second graphical avatar from the user profile information of the first user account and the second user account.

* * * * *